United States Patent [19]
Stern

[11] Patent Number: 5,462,203
[45] Date of Patent: Oct. 31, 1995

[54] DISPENSER FOR DISPERSING CONVENIENT UNITS OF TWO LIQUID PRODUCTS

[75] Inventor: Leif E. Stern, Lomma, Sweden

[73] Assignee: Asept International AB, Lund, Sweden

[21] Appl. No.: 192,850

[22] Filed: Feb. 7, 1994

[30] Foreign Application Priority Data

Feb. 11, 1993 [SE] Sweden ................................. 9300447

[51] Int. Cl.$^6$ ............................................. B67D 5/52
[52] U.S. Cl. .................. 222/137; 222/145.1; 222/145.3; 222/162; 222/324; 222/341; 222/441; 222/448; 222/472; 222/514
[58] Field of Search ............................. 222/135, 136, 222/137, 145, 162, 323, 324, 341, 441, 448, 449, 450, 469, 470, 472, 509, 514

[56] References Cited

U.S. PATENT DOCUMENTS

| | | | |
|---|---|---|---|
| 2,636,647 | 4/1953 | Covitt et al. | 222/470 X |
| 3,260,419 | 7/1966 | Weimer et al. | 222/472 X |
| 4,050,612 | 9/1977 | Stone | 222/162 X |
| 4,690,306 | 9/1987 | Stäheli | 222/162 X |
| 5,080,259 | 1/1992 | Hadley | 222/145 X |
| 5,209,376 | 5/1993 | Dirksing | 222/162 X |
| 5,244,122 | 9/1993 | Botts | 222/145 X |

FOREIGN PATENT DOCUMENTS

4113825 10/1992 Germany .
4120644  3/1993 Germany .

Primary Examiner—Andres Kashnikow
Assistant Examiner—Joseph A. Kaufman
Attorney, Agent, or Firm—Foley & Lardner

[57] ABSTRACT

The present invention relates to a dispenser for feeding out convenient units of two liquid products. The dispenser (1), preferably, is intended for manual handling and manual feed-out of viscous products, such as mustard (2), ketchup (3), or similar sauces on food products, such as hamburger bread rolls (4) or the like. To bring about an essential reduction of the time required for feeding out convenient units of the two liquid products (2, 3), the dispenser (1) was a first container (5) holding one liquid product (3), a second container (15) positioned within the first container, the second container holding the other liquid product (2), and a pump assembly (18) adapted to simultaneously feed out convenient units of the two liquid products (2, 3) from their respective containers (5, 15).

13 Claims, 8 Drawing Sheets

DISPENSER FOR DISPERSING CONVENIENT UNITS OF TWO LIQUID PRODUCTS

BACKGROUND OF THE INVENTION

This invention relates to a dispenser for dispensing convenient units of two liquid products. The dispenser is preferably intended for manually handling and manually feeding out viscous products such as mustard, ketchup, or similar sauces on food products, such as hamburger bread rolls or the like.

Hamburgers are usually served with mustard and ketchup, which are dispensed separately on the hamburger bread rolls from different containers. Such a dispensing procedure takes a long time, which manifests itself particularly when many hamburgers have to be served in a short period of time. Besides, a rather comprehensive equipment is required to carry out said dispensing procedure.

SUMMARY OF THE INVENTION

The aim of the present invention is to improve a dispenser of the above-mentioned type so that dispensing time is reduced considerably, and a dispenser of simple and easy-to-clean design is obtained.

By reason of the fact that one container that holds one of the two products to be dispensed is arranged within the other container that holds the other of the two products, there is realized a compact and readily handled dispensing unit. By causing the pump assembly to feed out convenient units of the two products simultaneously, dispensing time is essentially reduced.

DESCRIPTION OF THE DRAWINGS

The invention is elucidated more in detail in the following with reference to the accompanying drawings in which.

DESCRIPTION OF THE PREFERRED EMBODIMENTS

The dispenser 1 illustrated in the drawings is preferably intended to feed out convenient units of mustard 2 and ketchup 3 on a hamburger bread roll 4. The dispenser 1 has a first container 5, preferably of transparent material, which comprises an upper part 6 with a handle 7, and a lid. The lid 8 is mounted to permit swinging about an axis 9 for opening of the first container 5. The first container 5 merges at its lower end via a tapering member 10 into a discharge member 11. An outer end wall 12 of discharge member 11 is provided with discharge openings 13 for mustard 2, and discharge openings 14 for ketchup 3.

The dispenser 1 further has a second container 15, preferably of transparent material. The second container 15 is lowerable into the first container 5 and, in the lowered position, vertically movable in relation to the first container 5. The movements of the second container 15 with respect to the first container 5 are guided preferably by guide blades 16 provided at the top of the second container 15 and engaged between guide flanges 17 provided at the top of the first container 5.

The dispenser 1 comprises a pump assembly 18 for feeding out convenient units of mustard 2 from the second container 15 and, at the same time, of ketchup 3 from the first container 5. To bring about the simultaneous feed-out of mustard 2 and ketchup 3, the second container 15 is arranged and/or formed as a piston device 19 in the pump assembly 18. The piston device can be effected to provide dispensing movements (in the direction of the arrow P in FIG. 1) for said feed-out.

Figure 1:
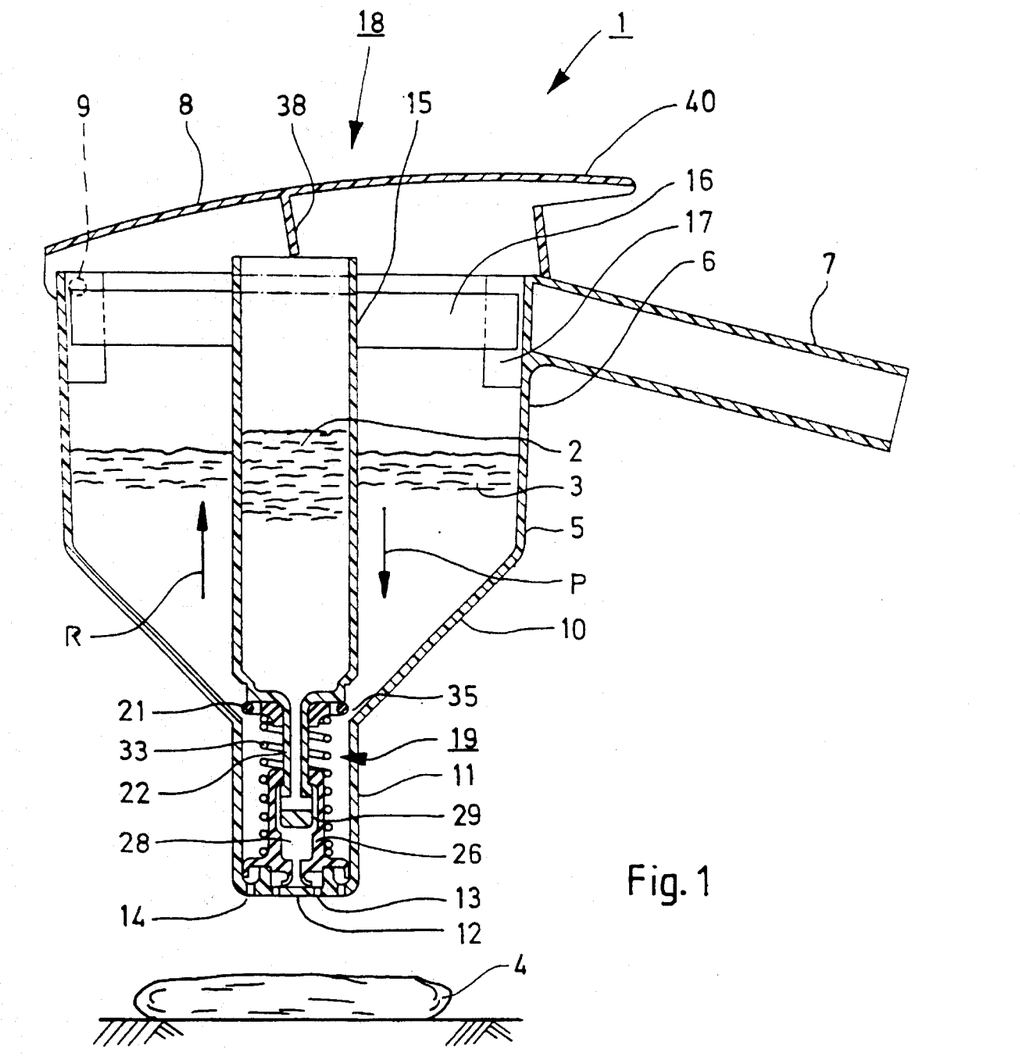
FIG. 1 is a vertical section of a dispenser according to the invention.

The piston device 19 formed by the second container 15 presents a valve seat 20 against which an outer sealing ring 21 is adapted to bear. The second container 15 further presents an inner piston 22, which extends downwardly and at its lower end has an enlarged end portion 23. The inner piston 22 has a throughflow passage 24. The throughflow is connected via a longitudinal branch, at an upper end, to the interior of the second container 15, and via a transverse branch, at a lower end, opens into lateral surfaces 25 of the enlarged end portion 23. The inner piston 22 projects from above into a valve housing 26 of elastic material so that its enlarged end portion 23 is situated within said valve housing. The enlarged ed portio 23 is movable in an upper throughflow chamber 27 in the valve housing 26, and in a lower feed-out chamber 28 connecting thereonto in the valve housing 26. The throughflow chamber 27 has a slightly larger diameter than the enlarged end portion 23. This allows mustard 2 to flow from the interior of the second container 15, via the throughflow passage 24 and via a throughflow gap 29 formed by throughflow chamber 27, down into the feed-out chamber 28. The feed-out chamber 28, however, has the same diameter as or a slightly smaller diameter than the diameter of the enlarged end portion 23 of the inner piston 22. This implies that the enlarged end portion 23 and the valve housing 26 will tightly bear against one another when the enlarged end portion 23, during its feed-out movement P is pushed down into the feed-out chamber 28. The valve housing 26 will then also close the mouths of the throughflow passage 24. By reason of the seal arising between the enlarged end portion 23 and the valve housing 26 when the enlarged end portion 23 performs its feed-out movement P in the feed-out chamber 28, the mustard 2 contained in the feed-out chamber 28 will be pressed out of said chamber. At this feed-out, mustard 2 will be pressed against the check valve 30 so that said valve opens. Subsequently, mustard 2 will be forced out through the discharge openings 13 onto the hamburger bread roll 4.

Figure 2:
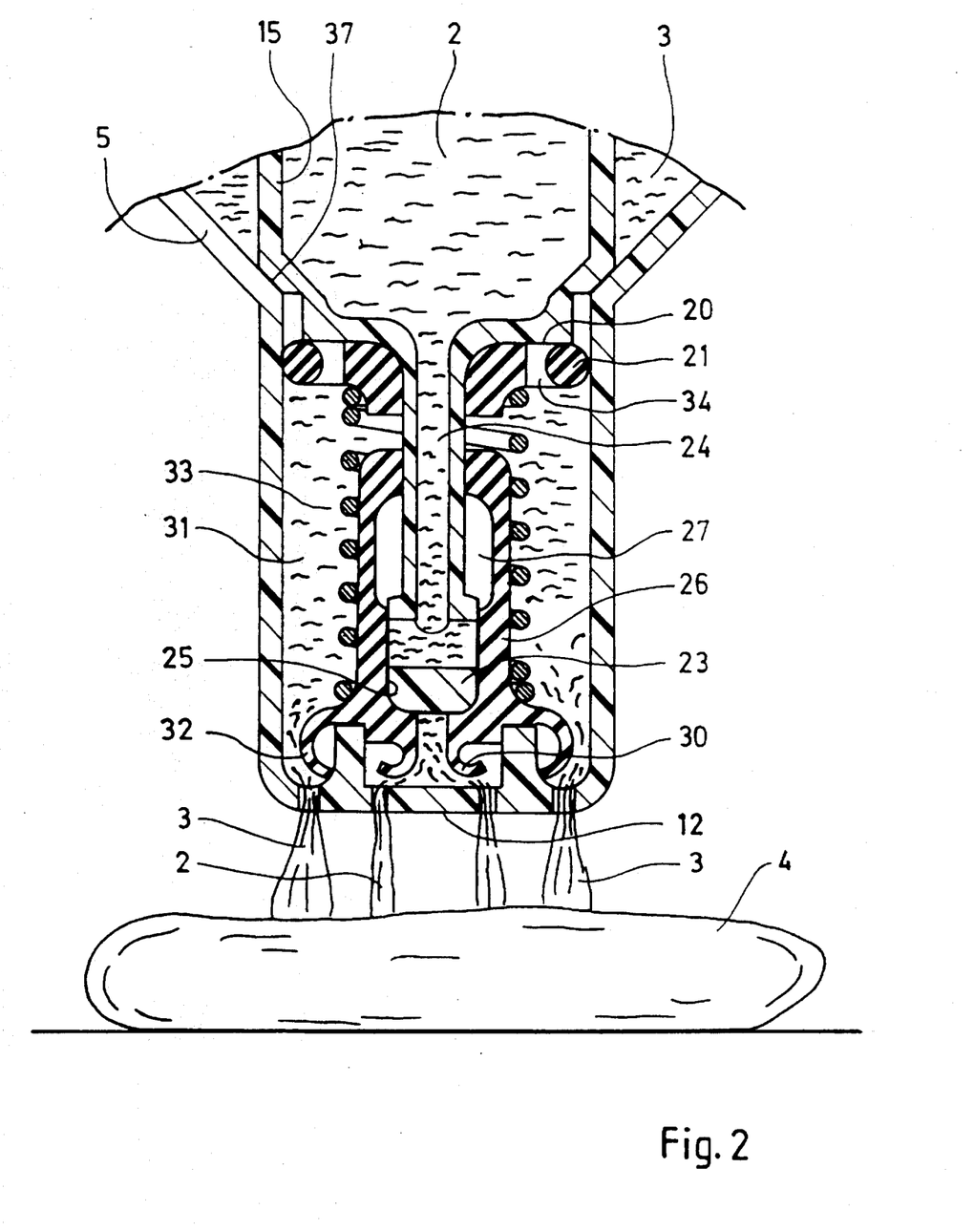
FIG. 2 is a vertical section of lower parts of the dispenser shown in FIG. 1 during a dispensing operation.

At the feed-out movements P of the piston device 19, the outer sealing ring 21 will be moved down into the discharge member 11. The sealing ring 21 will press against its valve seat 20 while sliding and establish a sealing effect against the inner side of the discharge member 11. As a result, the connection between an outer dispensing chamber 31 and the upper portions of the first container 5 is closed. Ketchup 3 contained in the outer dispensing chamber 31 will thus be fed out of the dispensing chamber 31 with the aid of the outer sealing ring 21. During this feed-out the ketchup 3 will be pressed against an outer check valve 32 so that said valve opens, and allows ketchup to reach the discharge openings 14 through which it is fed out in convenient units on the hamburger bread roll 4 (see FIG. 2).

Figure 3:
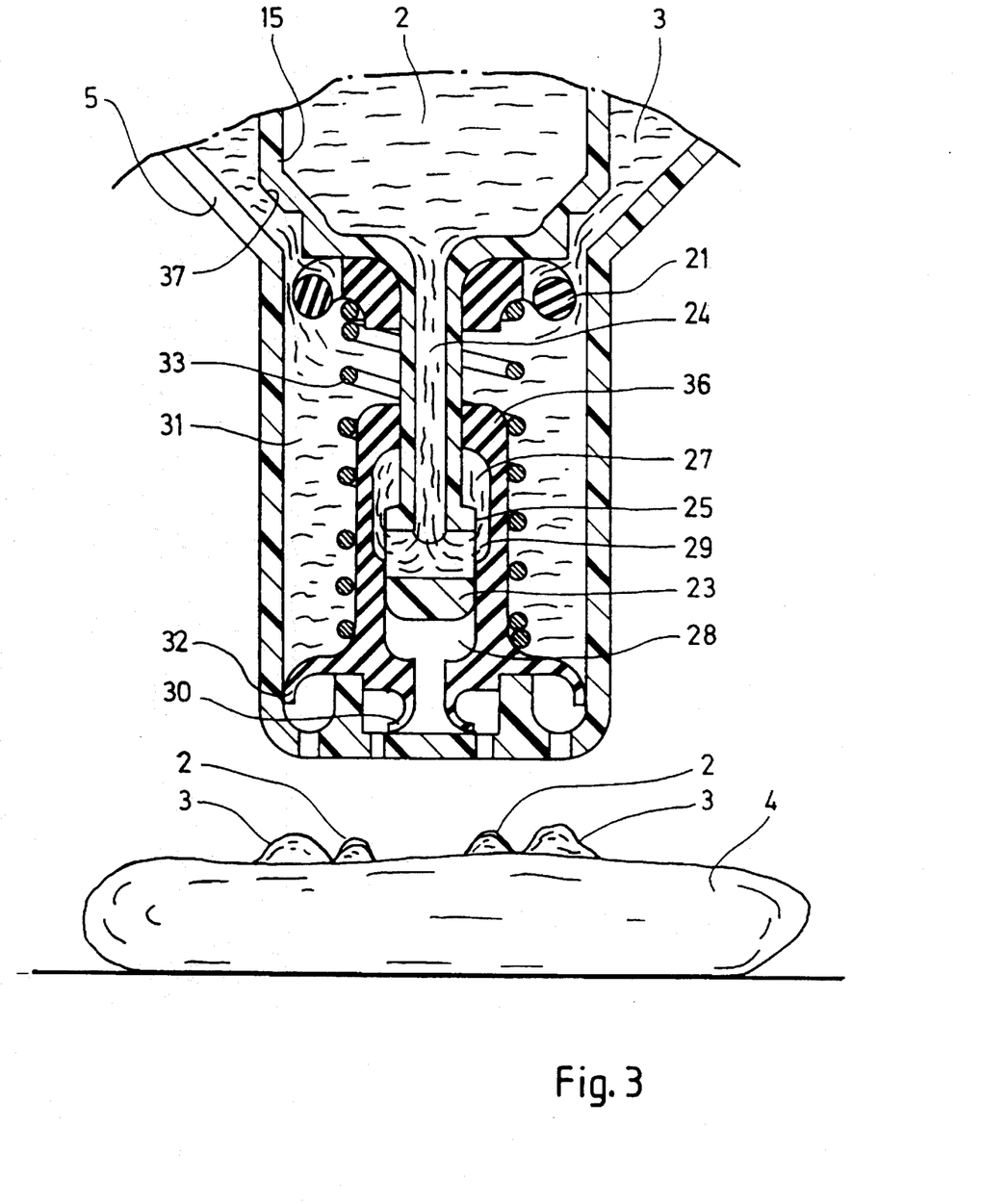
FIG. 3 is a vertical section of lower parts of the dispenser shown in FIG. 1 during a return stroke.
Figure 4:
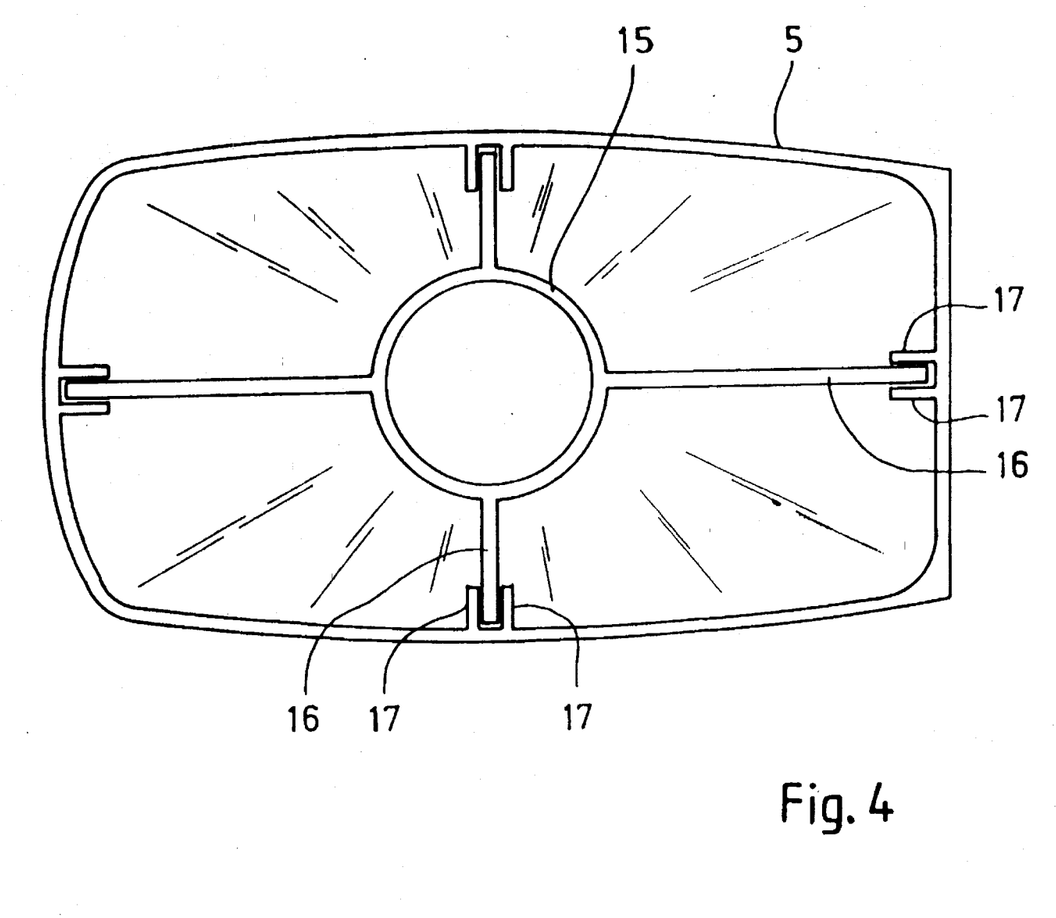
FIG. 4 is a plan view of the containers of the dispenser according to the invention.

The feed-out movements P of the piston device 19 take place against the action of a return means 33. Returning forces are imparted to the return means 33 when activated by the piston device 19 subjected to feed-out movements P. When the piston device 19 is released after feed-out of mustard 2 and ketchup 3 has been effected, the return means 33 imparts return movements R to the piston device 19. As a result, the inner piston 22 moves out of the feed-out chamber 28 of the valve housing 26, which implies that the check valve 30 is brought into a closing position, and there arises a pressure below atmospheric in the feed-out chamber 28 since the enlarged end portion 23 slides against the valve housing 26 under an established seal. This pressure below atmospheric in the feed-out chamber 28 results in mustard 2 being sucked into said feed-out chamber 28 when the enlarged end portion 23 has moved so far out of the feed-out chamber 28 that the mouths of the throughflow passages 24 are not obstructed any more by the valve housing 26. Thus, mustard 2 will be sucked from the upper parts of the second container 15, through the throughflow passage 24 and the throughflow gap 29 formed in the throughflow chamber 27 around the enlarged end portion 23, and down into the feed-out chamber 28 until the latter is filled with mustard 2 for the next dispensing operation.

Simultaneously as the feed-out chamber 28 is filled with mustard 2, when return movements in direction R are imparted to the piston device 19, the outer dispensing chamber 31 is filled with ketchup 3. This is brought about by the outer check valve 32 returning to closed position when the pressure against it ceases, and by the outer sealing ring 21 at its upward movement against the ketchup 3 above it being caused by the ketchup pressure to fold downwards. This causes the outer sealing ring 21 to leave its valve seat 20 and/or its contact with the inner side of the discharge member 11. As the outer sealing ring 21 takes this shape, ketchup 3 from the upper parts of the first container 15 flows, via openings 34 in the outer sealing ring 21 and/or via the gap arising between the outer sealing ring 21, and the inner side of the discharge member 11 down into the outer dispensing chamber 31. The outer sealing ring 21 furthermore may be so arranged that there is a gap 35 formed between it and the inner side of the first container 5 when the second container 15 occupies its upper position. This will permit ketchup 3 to flow down into the outer dispensing chamber 31 after the second container 15 has occupied an upper position.

Figure 5:
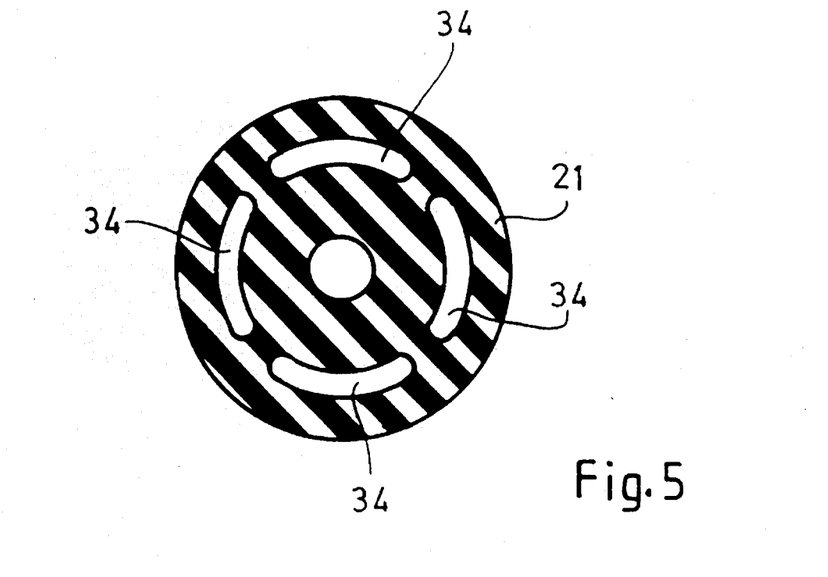
FIG. 5 is a section view of a sealing ring in the dispenser shown in FIG. 1.

The outer sealing ring 21 is preferably formed in such a way and consists of, or is provided with, such an elastic material that it can be passed over the enlarged end portion 23 of the inner piston 22. The outer sealing ring 21 may furthermore be moved along the inner piston 22 until it abuts against the valve seat 20, and it functions as a check valve at the feed-out and during the return movements R.

The return means 33, preferably, is a prestressed coil spring. The coal spring is passed onto the inner piston 22 so that the upper end of the coil spring bears against such inner parts of the outer sealing ring 21 that are supported by lower parts of the second container 15. The coil spring bears with its lower end against such parts of the valve housing 26 that are supported by lower parts of the first container 5. So positioned, the coil spring will be compressed when the second container 15 is urged downwards in order to perform feed-out movements P. The feed-out movements P may be restricted with the aid of at least one such abutment surface 37 of the second container 15. The abutment surface 37 abuts against lower parts of the tapering member 10 of the first container 5.

For the fixation of the valve housing 26 and the return means 33 of the inner piston 22, the valve housing 26 comprises an elastic material or consists, preferably in its entirety, of elastic material. The valve housing has a perforated end wall 36 which can snap in behind the enlarged end portion 23 of the inner piston 22. Furthermore, said end wall 36 is shaped to permit sliding on the inner piston 22, above the enlarged end portion 23 thereof. Preferably, the valve housing 26 is shaped to retain both the valve housing 26 and the return means 33 to the inner piston 22. The end wall 36 bears against the inner piston 22 with such sealing effect that air cannot pass between said parts.

The check valves 30 and the outer check valves 32 suitably include parts of elastic material that are comprised in the valve housing 26 and extend downwardly from said housing. Furthermore, said parts are preferably of such a shape that they bear, in closed positions, against the inside of the discharge member 11 of the first container 5 and, in opened positions, are folded inwardly from said inside.

The above-described dispenser 1 can readily be manually assembled and disassembled without the use of tools. For disassembly of the dispenser 1 the lid 8 is opened and the second container 15 is withdrawn in an upward direction from the first container 5. Then the valve housing 26 can be pulled free from the inner piston 22, and as a result the return means 33 is uncovered for removal from the inner piston 22. Finally, the outer sealing ring 21 also can be removed from the inner piston 22, which implies that the dispenser 1 comprises only five readily detachable parts which are easily cleaned, for instance by flushing, after a day's use. The five parts are as easily assembled in the reverse order.

As will appear from the drawings, the lid 8 may function as the pump handle of the pump assembly 18. The pump handle may present a downwardly directed abutment 38 by which the lid 8 bears against the upper edge of the second container 15 serving as a piston assembly 19. The lid 8 may be so dimensioned and/or arranged that it restricts the return movements R of the second container 15 in an upward direction, or the first container 5 may present some other part that brings about said restriction of movement.

As will also appear from the drawings, the dispenser 1 permits feeding out predetermined units of both mustard 2 and ketchup 3, and feed-out can be effected with exactly predetermined quantitative relations of mustard 2 to ketchup 3. The, the feed-out chamber 28 for mustard 2 is considerably smaller than the outer dispensing chamber 31 for ketchup 3, which implies that at each pump stroke there is fed out a much smaller unit of mustard 2 than of ketchup 3.

Figure 6:
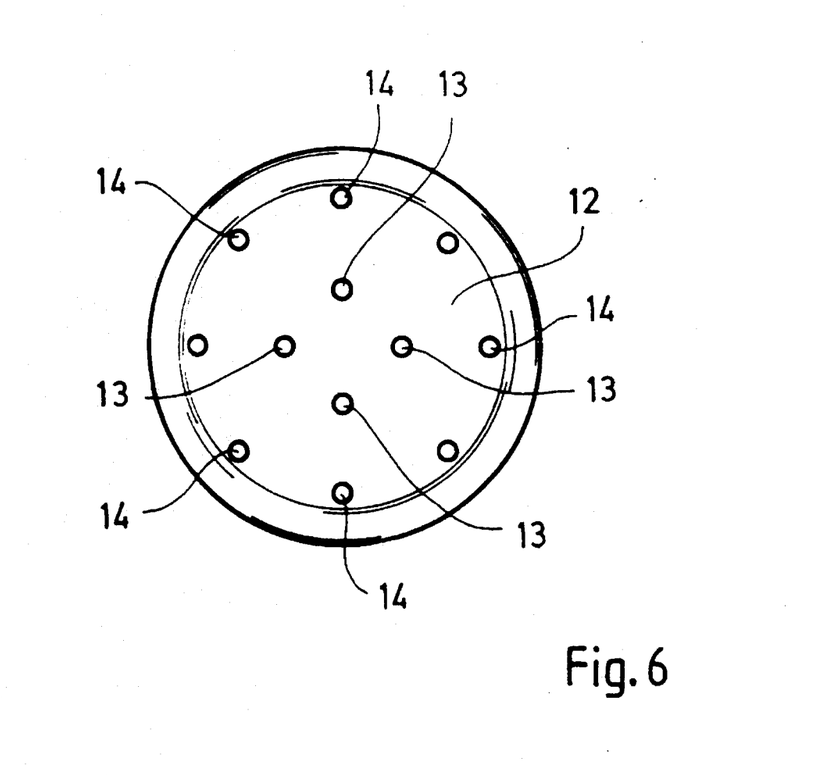
FIG. 6 is a view of an end portion of the dispenser shown in FIG. 1, in which portion discharge openings are provided.

In the outer end wall 12 there may be provided four discharge openings 13 for mustard 2 spaced equal distances apart on a circle, and eight discharge openings 14 for ketchup 3 spaced equal distances apart on a larger circle having approximately the same centre (see FIG. 6).

The dispenser 1 preferably is in the form of a hand-held dispensing tool which can be held by the handle 7 with one hand. With the thumb of the same hand, dispensing can be brought about by exerting a downward pressure on for example a projecting portion 40 of the lid 8. With the other hand the first container 5 can be held firmly. Preferably this can be done by grasping the part of the container 5 opposite to the handle 7. Holding the dispenser 1 in this way, it can be easily and rapidly moved from one place to another, and thus be kept in a suitable position with respect to the hamburger bread rolls 4 to which mustard 2 and ketchup 3 is to be supplied.

In the dispenser 1 described above and illustrated in the drawings, the pump assembly 18 comprises a piston assembly 19 consisting of the second container 15 and parts arranged thereon. However, the pump assembly 18 may be designed in any other suitable manner to effect simultaneous feed-out of the two liquid products 2, 3. The piston assembly 19 may comprise other parts than the second container 15, and there may be provided, for example, a piston assembly having two cooperating pistons, one of said pistons being intended for dispensing one product and the other piston for simultaneous dispensing of the other product.

Moreover, other parts of the dispenser 1 illustrated may be given other designs. For example, the outer sealing ring 21 may be designed as another sealing means. Other parts also, such as the inner piston 22, the valve housing 26, the check valves 30, 32 and the return means 33 may be given other designs, however with retained functions. The liquid products may be liquid foodstuffs other than mustard and ketchup, preferably viscous foodstuffs, and these liquid products may be adapted for dispensing onto products other than hamburger bread rolls, e.g. other food products.

Figure 7:
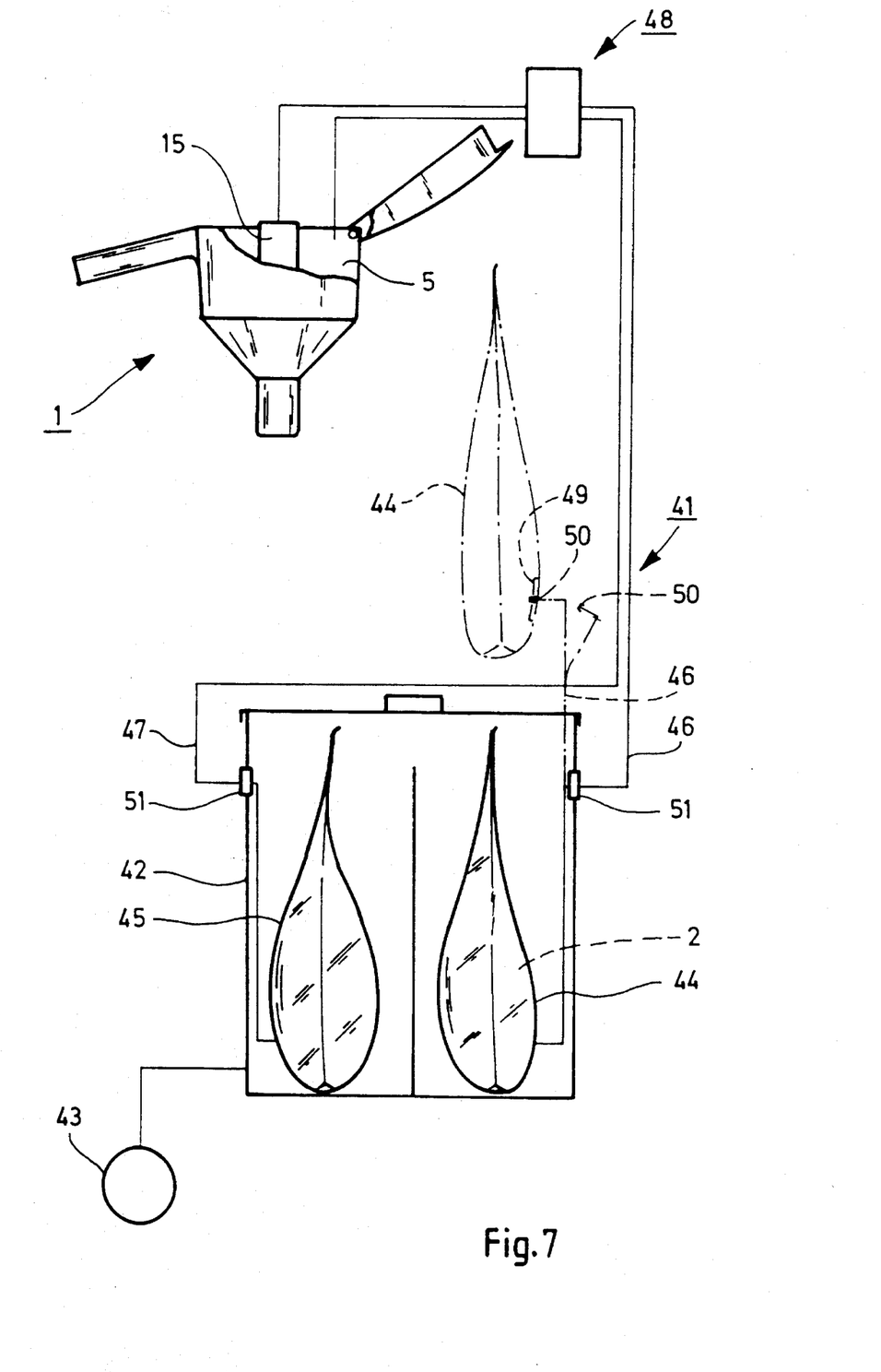
FIG. 7 is a diagrammatic view of a filling device provided in the dispenser according to the invention.

For filling the two liquid products 2, 3 into the dispenser 1, a filling device 41 is used (see FIG. 7). This device comprises a pressure container 42, in which a pressure above atmospheric can be generated with the aid of a pressure source 43 connected thereto. The pressure container 42 is designed in such a way that two storage receptacles 44, 45 can be placed therein, viz. a storage receptacle 44 containing one liquid product 2, and another storage receptacle 45 containing the other liquid product 3.

Conduits 46, 47 are provided to conduct the liquid products 2, 3 contained in their respective storage receptacles 44, 45 out of the pressure container 42. The two storage receptacles 44, 45 consist of a flexible material and can shrink with the aid of a pressure above atmospheric in the pressure container 42 to force the products 2, 3 out of the storage receptacles 44, 45 through the conduits 46, 47.

The conduits 46, 47 cooperate with a valve mechanism 48. The valve mechanism 48 can be set for closing or opening the conduits 46, 47 so that the liquid products 2, 3 are either prevented from being fed out of their storage receptacles 44, 45 or are fed out of the receptacles to fill the dispenser 1.

Each storage receptacle 44, 45 can be of the fully closed type that on the inside of its wall material has a holder 49. Each conduit 46, 47 may present a discharge nozzle 50 fitting the holders 49. Each storage receptacle 44, 45 can be opened for emptying of the product contained therein. The discharge nozzle 50 is forced through the container wall material and into the holder 49 so that the discharge nozzle 50 fixedly adheres to the holder 49, connecting on to the wall material in an air-tight manner. By this arrangement the storage receptacles 44, 45 can rapidly be opened by means of the conduits 46, 47 for emptying the products 2, 3 contained in said receptacles and at the same time the conduits 46, 47 can be rapidly and fixedly connected to said receptacles. Coupling of the respective conduit 46 and 47, respectively, to the respective storage receptacle 44, 45 can be effected when the storage receptacles 44, 45 are outside of the pressure container 42 (a receptacle is shown in such a position by dash and dot lines in FIG. 7). The conduits 46, 47 are arranged in such a manner on the pressure container 42 that they permit placing the storage receptacles 44, 45 within the pressure container 42.

The conduits 46, 47 are preferably passed through holes in the sides of the pressure container 42 to allow removal from the pressure container 42 for cleaning purposes. The conduits 46, 47 may possibly be drawn into the pressure container 42 via sealing plugs 51. The conduits 46, 47 may also be detachable from the valve mechanism 48 so that they can be altogether released for cleaning purposes.

Figure 8:
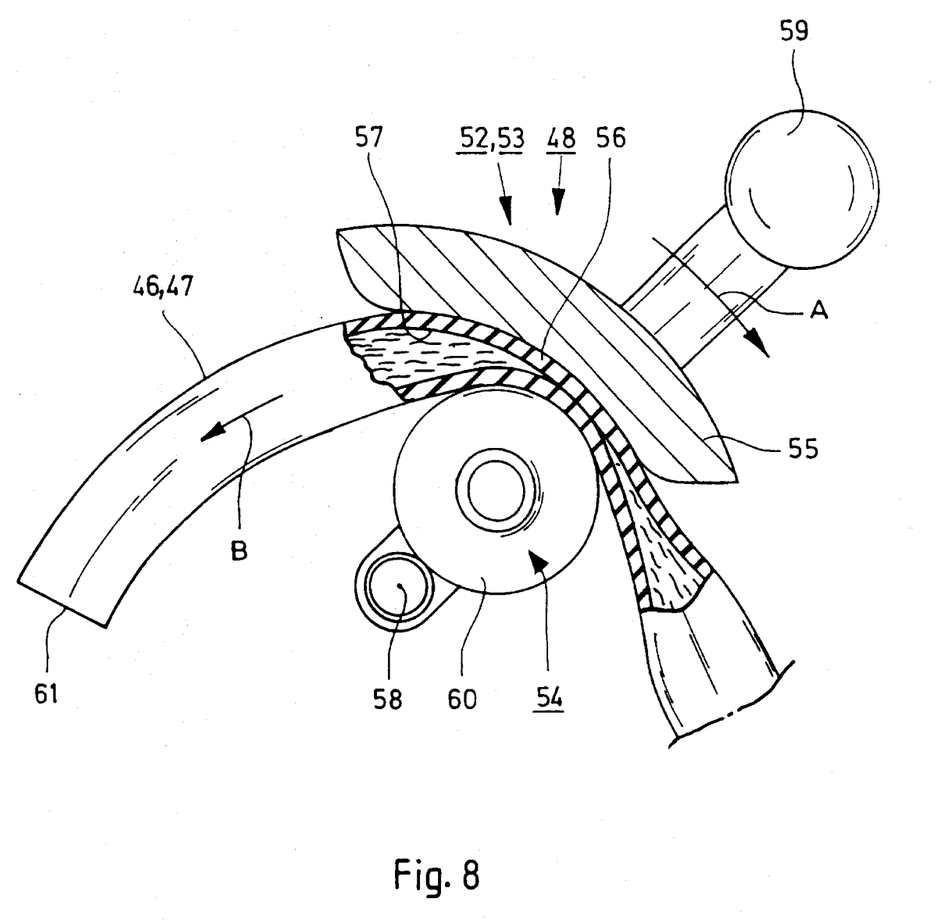
FIG. 8 is a partial section of a valve mechanism occupying a closed position, the value mechanism is used in the filling device shown in FIG. 7.
Figure 9:
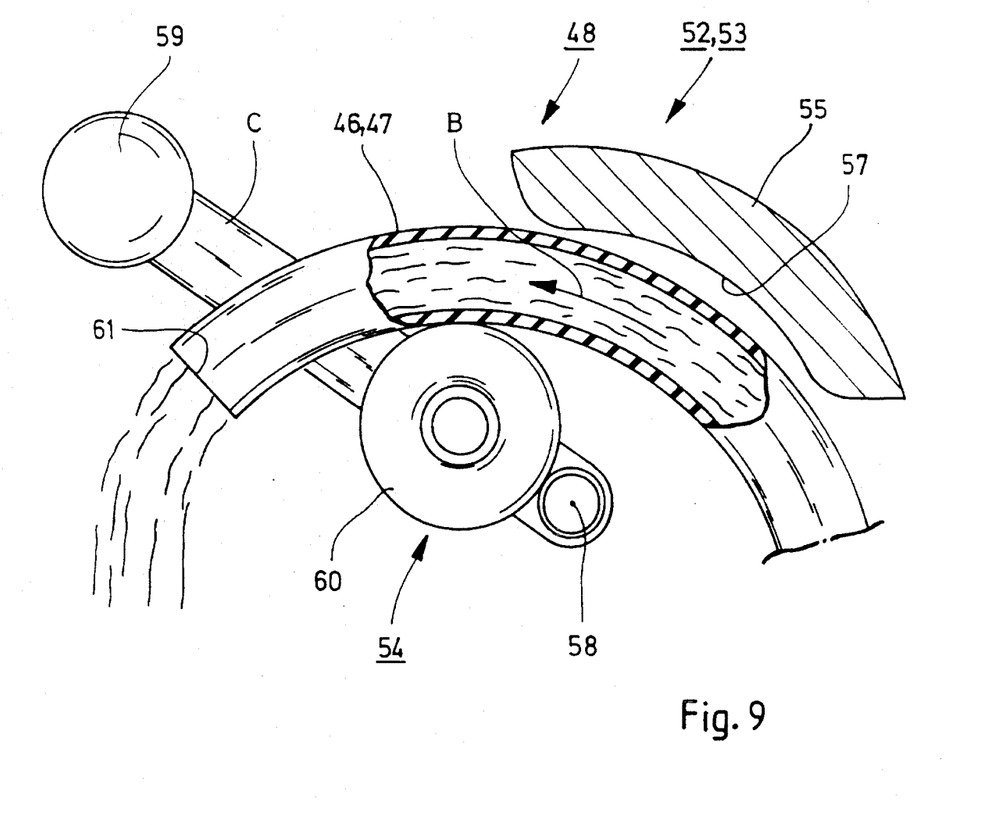
FIG. 9 is a partial section of the valve mechanism of FIG. 8 in an open position.

The valve mechanism 48 preferably has one valve 52, 53 for each of the conduits 46, 47 so that one conduit 46 or 47 at a time can be opened and closed. Each valve 52 or 53 preferably has a clamping means 54 and a hold-up means 55 between which an elastic part of the respective conduits 46 and 47, respectively, can be placed. The clamping means 54 preferably has a handle 59 which is rotatably mounted about a centre of rotation 58 and which is provided with a rotatably mounted pinch roll 60. The hold-up means 55 has an arcuate hold-up surface 57 which is preferably centred with said centre of rotation 58, and the pinch roll 60 is spaced such a distance from the hold-up surface 57 that the part of the respective conduit 46 and 47, respectively, running therebetween is flattened, i.e closed. By rotating the handle 59 to a position C in front of the hold-up surface 57 the respective conduit 46, 47 is released so that it can open up. By rotating the handle 59 in direction A the respective conduit 46, 47 will be flattened as the pinch roll 60 reaches a position at the hold-up surface 57. By continued rotation of the handle 59 in direction A the pinch roll 60 will successively move along the hold-up surface 57 in direction A opposite to the feed-out direction B. This implies that the flattened area 56 will successively move along the hold-up surface 57 in direction A opposite to the feed-out direction B. As a result, the product units located below the flattened area 56, as seen in feed-out direction B, will be sucked in direction A opposite to the feed-out direction B. This also implies that any product hanging outside the mouth of the respective conduit 46 and 47, respectively, will be sucked back into the respective conduit 46 and 47.

For filling mustard 2 and ketchup 3 into the dispenser 1 the mouth of the conduit 46 is placed in the first container 5 and the mouth of the conduit 47 in the second container 15.

It will be understood that various modifications in the form of the invention as described herein in its preferred embodiment may be made without departing from the spirit and the scope of the claims which follow.

I claim:

1. A dispenser for dispensing convenient units of two liquid products, said dispenser comprising: a first container (5) for holding one liquid product (3) and a second container (15) arranged within the first container (5) for holding the other liquid product (2); wherein a piston assembly (19) in a pump assembly (18) being movably mounted-in the first container (5) providing a feed-out movement (P) for feeding convenient units of the two liquid products (2, 3) simultaneously out of the first and the second containers (5, 15); wherein the piston assembly effects the feed-out movements (P) by being urged towards at least one return means (33) for feeding out convenient units of the liquid products (2, 3) through discharge openings (13, 14) in the dispenser (1) and the piston assembly (19) comprising:

at least one outer sealing means (21) under tight application against the first container (5) forcing the liquid product (3) collected in an outer dispensing chamber (31) in the first Container (5) through at least one of said discharge openings (14); and at least one inner piston (22) under tight application against a wall of a valve housing (26) forcing liquid product (2) collected in a feed-out chamber (28) in the valve housing (26) through at least one of said discharge openings (13); wherein the at least one outer sealing means (21) of the piston assembly (19) during a return movement (R) of the piston assembly (19) in a direction opposite to its feed-out movement (P) admits units of liquid product (3) to the dispensing chamber (31) of the first container (5) and wherein one of the at least one inner piston (22) and the valve housing (26) during said return movement (R) admits units of liquid product (2) to the feed-out chamber (28) in the valve housing (26).

2. A dispenser as claimed in claim 1, wherein the at least one outer sealing means (21) during feed-out movements (P) of the piston assembly (19) bears against a valve seat (20) on the piston assembly (19) and sealingly slides along an inner side of the first container (5) so that the outer sealing means (21) closes a connection between the feed-out chamber (28) of the first container (5) and the other parts of the first container (5), wherein the at least one outer sealing means (21) during the return movements (R) of the piston assembly (19) forms a shape with respect to one of the inner side of the first container (5) and the valve seat (20) to create a connection between the outer dispensing chamber first container (5) and the other parts of the first container (5), and wherein the outer sealing means (21) in an upper position adjusts itself relative to the inner side of the first container (5) such that a gap (35) between the outer sealing means (21) and the inner side is formed, whereby units of liquid products (3) can flow from the first container (5) into the outer dispensing chamber (31) thereof.

3. A dispenser as claimed in claim 1, wherein the valve housing (26) and the inner piston (22) are arranged so that, during return movements (R) of the piston assembly (19), a pressure below atmospheric is created in the feed-out chamber (28) of the valve housing (26) such that units of liquid product (2) are sucked into the feed-out chamber (28) of the valve housing (26) from the second container (15).

4. A dispenser according to claim 1, wherein the valve housing (26) comprises a throughflow chamber (27) in which the inner piston (22) is adjustable in such a manner that units of the liquid product (2) in the second container (15) can pass through at least one throughflow passage (24) in the inner piston (22) from the second container (15) to the feed-out chamber (28) of the valve housing (26), wherein the inner piston (22) during feed-out movements (P) of the piston assembly (19) moves into the feed-out chamber (28) in the valve housing (26) such that the part of the inner piston (22) is situated in the feed-out chamber (28) against the valve housing (26) under a seal so that the throughflow passage (24) of the inner piston (21) is closed and then the inner piston (22) feeds out convenient units of the product (2) contained in the feed-out chamber (28) from said chamber during feed-out movements (P) of the piston assembly (19), and wherein the inner piston (22) provides a pressure below atmospheric in the feed-out chamber (28) during return movements (R) of the piston assembly (19) so that units of the product (2) contained in the second container (15) are sucked into the feed-out chamber (28) through the throughflow chamber (27) when the part of the inner piston (22) bearing against the valve housing (26) leaves the feed-out chamber (28).

5. A dispenser as claimed in claim 1, wherein the valve housing (26) consists of an elastic material arranged on the inner piston (22) to form a perforated end wall (36) of the valve housing (26) to snap in behind an enlarged end portion (23) of the inner piston (22) and the end wall (36) is shaped to permit the valve housing (26) to retain the at least one return means (33) having a top applied against the second container (15) and a bottom supported by the valve housing (26) in a lower part of the first container (5).

6. A dispenser for dispensing convenient units of two liquid products, said dispenser comprising: a first container (5) for holding one liquid product (3) and a second container (15) arranged within the first container (5) for holding the other liquid product (2); wherein a piston assembly (19) in a pump assembly (18) being movably mounted in the first container (5) providing a feed-out movement (P) for feeding convenient units of the two liquid products (2, 3) simultaneously out of the first and the second containers (5, 15); and check valves (30, 32) in a valve housing (26) for feeding out convenient units of the liquid products (2, 3) through discharge openings (13, 14) during the feed-out movement (P) of the piston assembly (19), wherein the check valves (30, 32) prevent admission of air through the discharge openings (13, 14) to feed-out and dispensing chamber (28, 31) for the liquid products (2, 3) during a return movement (R) of the piston assembly (19).

7. A dispenser as claimed in claim 6, wherein the dispenser is a hand-held dispensing tool to allow the dispenser to be held in one hand or two hands above and moved between feed-out points for simultaneously feeding-out convenient units of the two liquid products (2, 3), and wherein the pump assembly (18) is manually operable for feeding out convenient units of the two liquid products (2, 3) simultaneously when the hand-held dispensing tool is held above said feed-out points.

8. A dispenser for dispensing convenient units of two liquid products, said dispenser comprising: a first container (5) for holding one liquid product (3) and a second container (15) arranged within the first container (5) for holding the other liquid product (2); wherein a piston assembly (19) in a pump assembly (18) being movably mounted in the first container (5) providing a feed-out movement (P) for feeding convenient units of the two liquid products (2, 3) simultaneously out of the first and the second containers (5, 15); and at least one return means (33), the at least one return means being a coil spring mounted between a lower part of the first container (5) and a lower part of the second container (15); and wherein said coil spring is compressed against the spring action thereof when the first container (5) is moved during the feed-out movement (P) and said coil spring imparting a return movement (R) to the second container (15) when a feed-out of the liquid products (2, 3) has been accomplished.

9. A dispenser for dispensing convenient units of two liquid products, said dispenser comprising: a first container (5) for holding one liquid product (3) and a second container (15) arranged within the first container (5) for holding the other liquid product (2); wherein a piston assembly (19) in a pump assembly (18) being movably mounted in the first container (5) providing a feed-out movement (P) for feeding convenient units of the two liquid products (2, 3) simultaneously out of the first and the second containers (5, 15); wherein, the second container being withdrawable from the first container (5), wherein an outer sealing means (21) is detachably mounted on the second container (15) to permit feed-out of convenient units of liquid products (3) from the first container (5), wherein a valve housing (26) that is detachably mounted on the second container (15) to permit feed-out of liquid products (2) from the second container (15), and wherein a return means (33) is detachably mounted on the second container (15) for causing the second container (15) to effect a return movement (R) opposite to the feed-out movement (P).

10. A dispenser as claimed in claim 9, wherein the dispenser (1) comprises said first and second containers (5, 15), the outer sealing means (21), the valve housing (26) and the return means (33), said parts permitting separation from one another without the use of tools and clean-flushing in a disassembled state and reassembly without the use of tools.

11. A dispenser for dispensing convenient units of two liquid products, said dispenser comprising: a first container (5) for holding one liquid product (3) and a second container (15) arranged within the first container (5) for holding the other liquid product (2); wherein a piston assembly (19) in a pump assembly (18) being movably mounted in the first container (5) providing a feed-out movement (P) for feeding convenient units of the two liquid products (2, 3) simultaneously out of the first and the second containers (5, 15); wherein the first container (5) has a pump handle in the form of a lid (8) which is part of the first container (5) and hinged to said first container; and wherein said pump handle is designed for manual operation by pressure, said pump handle subjects the second container (15) to the feed-out movement (P) in downward direction with respect to the first container (5).

12. A dispenser as claimed in claim 10, wherein the pump assembly (18) during each feed-out movement (P) feeds out predetermined units of the two liquid products (2, 3) in a predetermined quantitative relation between the liquid products (2, 3) from their respective containers (5, 15) such that a considerably greater quantity of liquid product (3) is fed-out from the first container (5) than another liquid product (2) which is fed-out from the second container (15).

13. A dispenser as claimed in claim 11, wherein the pump assembly (18) feeds out at least one liquid product (2) via at least one opening (13), and the other product (3) of the at least liquid product via at least another opening (14), wherein said openings (13, 14) are arranged that a plurality of openings (14) for the product (3) to be fed out in a larger quantity surround at least one opening (13) for the product (2) to be simultaneously fed out in a smaller quantity.

\* \* \* \* \*